Figure 1:
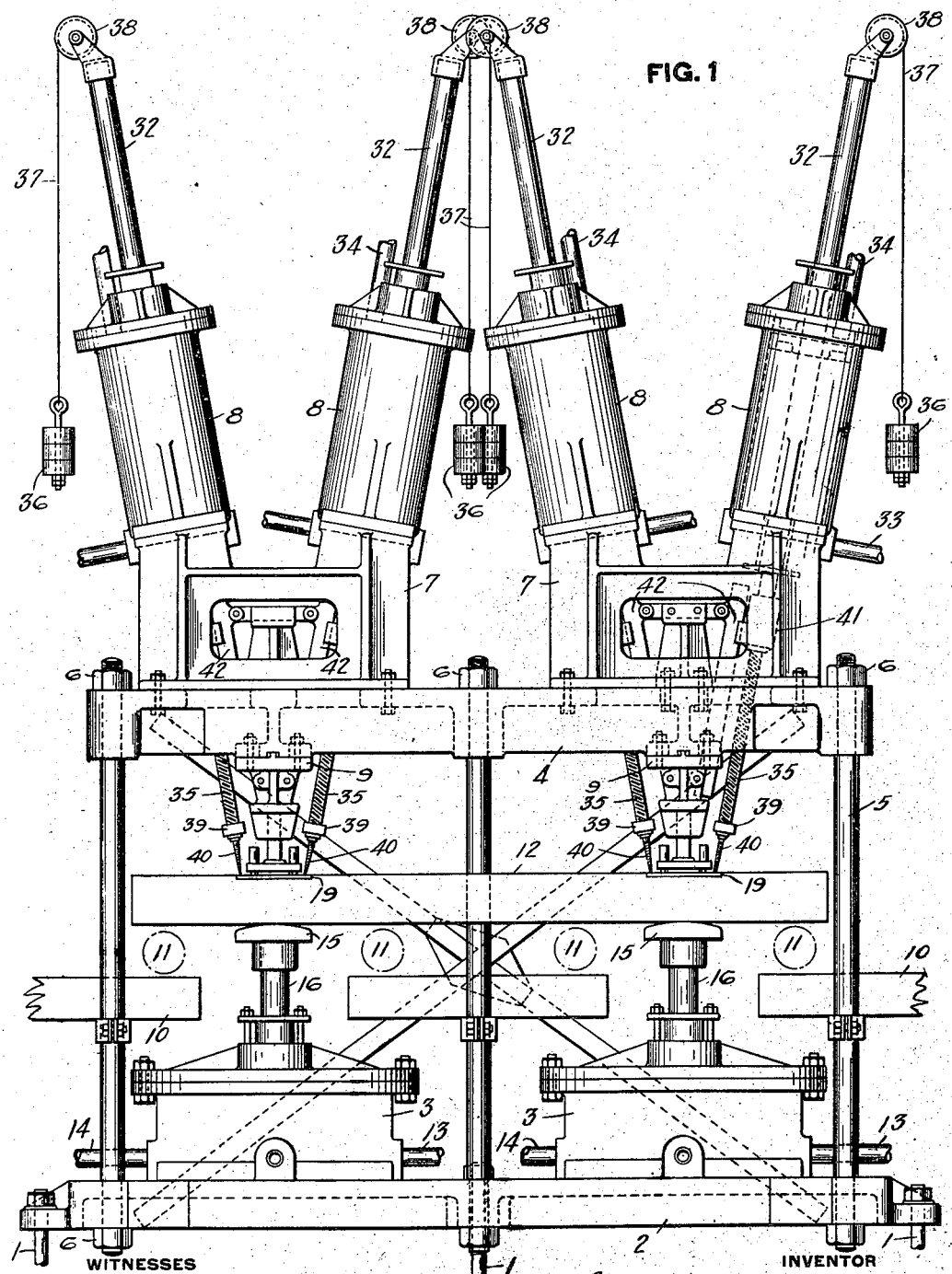

G. B. SHIPLEY.
SPIKE DRIVING MACHINE.
APPLICATION FILED JULY 23, 1915.

1,204,501.

Patented Nov. 14, 1916.
3 SHEETS—SHEET 1.

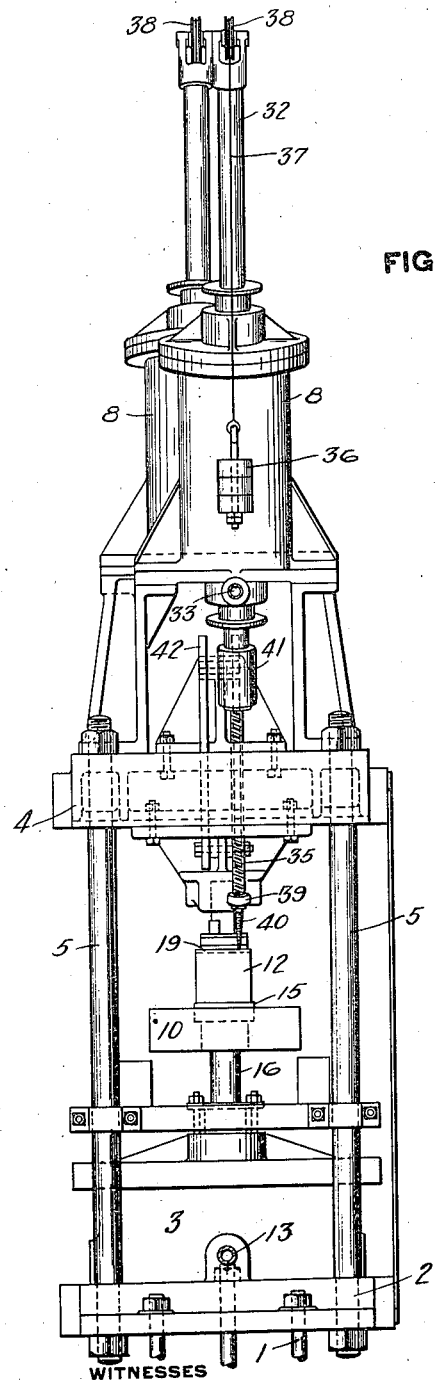
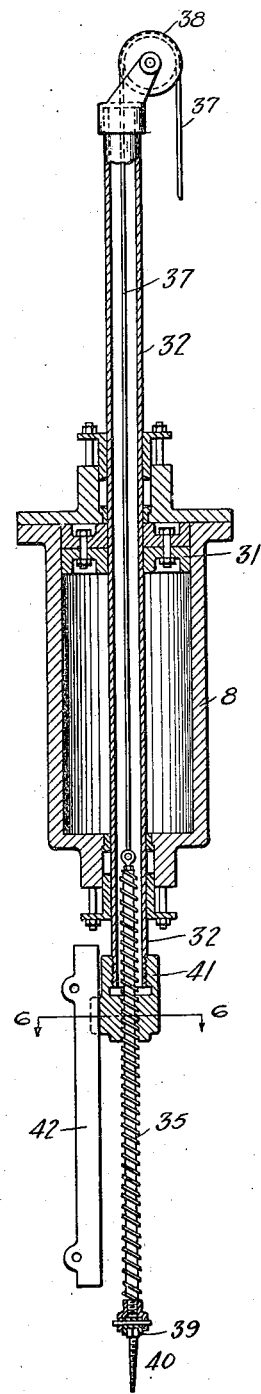

G. B. SHIPLEY.
SPIKE DRIVING MACHINE.
APPLICATION FILED JULY 23, 1915.
1,204,501.
Patented Nov. 14, 1916.
3 SHEETS—SHEET 3.
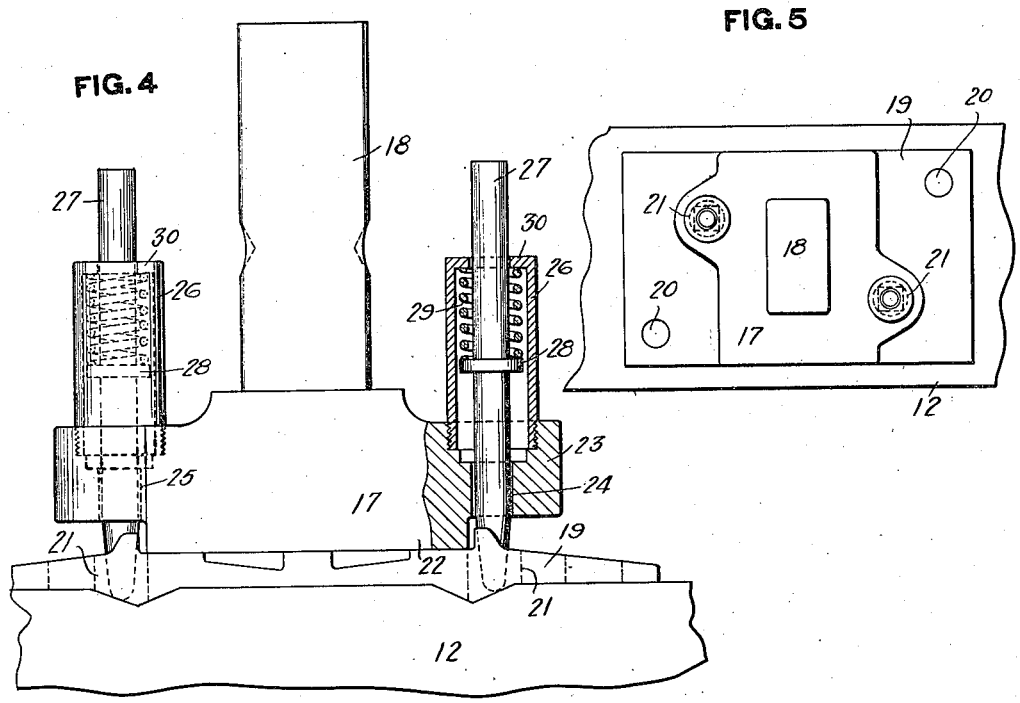
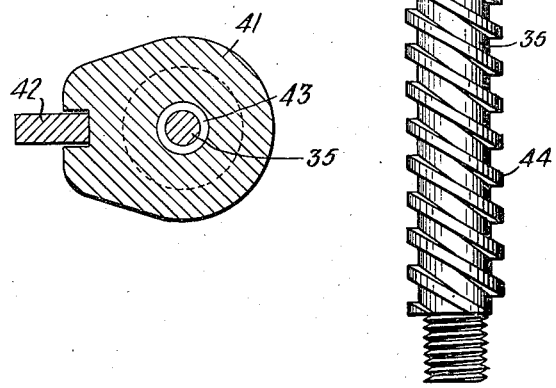
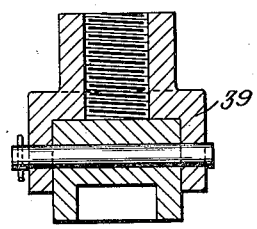
WITNESSES
INVENTOR
Grant B. Shipley.
By Fred'k W. Winter
Attorney

UNITED STATES PATENT OFFICE.

GRANT B. SHIPLEY, OF PITTSBURGH, PENNSYLVANIA.

SPIKE-DRIVING MACHINE.

1,204,501. Specification of Letters Patent. Patented Nov. 14, 1916.

Application filed July 23, 1915. Serial No. 41,576.

*To all whom it may concern:*

Be it known that I, GRANT B. SHIPLEY, a resident of Pittsburgh, in the county of Allegheny and State of Pennsylvania, have invented a new and useful Improvement in Spike-Driving Machines, of which the following is a specification.

This invention relates to a machine for driving screw spikes.

One object of the invention is to provide a machine which will operate simultaneously upon both ends of a railway cross tie to secure tie plates thereon, and which will drive the spikes for securing the tie plates quickly and efficiently. A further object of the invention is to provide means, in conjunction with the spike driving means, for securing a tie with the tie plates thereon firmly in position to be operated upon by the spike driving mechanism.

A still further object of the invention is to provide simple mechanism for driving the spikes which is designed to receive its power from a suitable source of pressure, preferably compressed air, and which is capable of resolving the downward thrust of the piston of a compressed air cylinder into components of rotation and of thrusting.

The invention comprises the construction and arrangement of parts as hereinafter described and claimed.

In the accompanying drawings, Figure 1 is a front elevation of the complete machine; Fig. 2 is a side elevation thereof; Fig. 3 is a central vertical section through one of the pressure cylinders of the machine showing the parts arranged to coöperate therewith for imparting to the screw spike its thrusting and rotational movement; Fig. 4 is a view of the means for securing a tie plate in position to be operated upon by the spike driving mechanism; Fig. 5 is a plan view of the tie plate holding magnet and a common form of tie plate adapted for use with the securing means and spike driving mechanism of the machine; Fig. 6 is a section on the line 6—6, Fig. 3, illustrating the nut for converting the thrusting movement of the piston rod of the pressure cylinder into a thrusting and rotational movement of the spike driving screw; Fig. 7 is a detail view of this screw; and Fig. 8 is a detail view of the chuck arranged to be secured to the end of the operating screw for receiving the head of a screw spike.

The machine is mounted on a frame comprising a lower table 2 and an upper table 4 connected by means of uprights or tie rods 5 secured to the tables 2 and 4 by any suitable means, such as nuts 6. Supported on the lower table 2 are a pair of pressure cylinders 3 provided with pressure connections 13 and 14 leading respectively to the under and upper faces of the pistons in said cylinders, and the piston rod 16 of each cylinder is provided with a shoe 15 for exerting pressure upon a tie and hold it in position to be operated upon by the screw spike driving mechanism of the machine. Mounted on the upper table 4 are a pair of castings 7, each of which supports a pair of pressure cylinders 8, the cylinders of each pair being inclined relative to each other at a slight angle to the vertical, and also being in staggered relation to each other. Depending from the table 4 are brackets 9 spaced apart a distance substantially equal to the distance between the tie plates to be secured to the tie and each provided with a member arranged to clamp a plate and tie between it and the shoe 15 of the corresponding cylinder 3. This clamping means comprises a permanent magnet 17 provided with a projection 18 arranged to be firmly secured in the bracket 9, and which member 17 serves to attract and hold by magnetic force a tie plate 19 in proper position upon the tie.

10 indicates diagrammatically a table and 11 rollers for introducing a tie 12, which is shown in position to have screw spikes driven thereinto. When a tie is to be introduced into the machine, the pistons of the cylinders 3 will be in their lowermost positions, so that the shoes 15 will lie below the highest points of the peripheries of the rollers 11. After the tie is introduced pressure is admitted to the under faces of the piston of cylinders 3 to raise the same and cause the shoes 15 to firmly clamp the tie, with the plates thereon, against the clamping members 17.

The tie plates 19 are provided with holes 20 at diagonally opposite corners for receiving the screw spikes for fastening them to the tie, and also with a pair of holes 21 inwardly from their ends and in staggered relation to each other for receiving the usual spikes for fastening the rail to the tie. The magnet 17 has a bottom face portion 22 arranged to engage the central portion of a plate, and with projecting portions 23 provided with holes 24 so positioned that they will lie over the rail spike holes 21 in the tie plates. Threaded to the projecting portions 23 concentric with the holes 24, are bushings 26 in each of which is slidably mounted a pin 27 arranged to project through the hole 24 and enter a rail spike hole 21 in the tie plate 19. The pins 27 are normally pressed downwardly by means of coiled springs 29 which surround said pins and at one end bear against collars 28 on said pins and their opposite ends engage the closed upper ends 30 of the bushings 26. If the tie plates and tie are in proper position relative to the shoes 15 and magnets 17, the pins 27 enter the holes 21 in the tie plates and prevent the plates from shifting on the tie during the operation of driving the screw spikes. If, however, the tie or tie plates are not in correct position, the pins 27 will not enter the holes 21, but will be forced upwardly against the force of springs 29 and will project above the upper ends of the bushings 26, so that the operator can readily tell whether or not the tie plates are in proper position. If not, the yielding engagement between the plate and this positioning means permits the tie or tie plate to be shifted until in proper position, whereupon the springs 29 will force the pins 27 downwardly into the holes 21.

Each of the pressure cylinders 8 is provided with a piston 31 and with pressure inlets 33 and 34 leading respectively to the lower and upper faces of said piston. Rigidly secured to each piston is a hollow piston rod 32, and loosely mounted in said piston rod is a screw 35 which is counterbalanced by a counterweight 36 connected by a cord 37 to said screw and passing over a sheave 38 mounted on the upper end of the piston rod. Secured to the lower end of the screw rod, such as by threading it thereon, is a chuck 39 for engaging and driving the spike 40. These spikes are driven by a downward thrust and rotating movement of the screws 35. The means for resolving the downward movement of the piston 31 into thrusting and rotational components comprise a nut 41 secured to the lower end of the piston rod 32 and moving downwardly with the same and held against rotational movement, such as being notched on one side face and engaging a guide bar 42 which is rigidly secured to the support 7 and table 4. This nut is screw threaded interiorly, as at 43, to engage the threads 44 on screw 35, and as it is held against rotation, its downward movement necessarily imparts rotation to the screw 35.

The lower end of screw 35 normally lies in such position that the distance between the upper surface of the tie 12 and the spike engaging surface of the chuck 39 will be exactly the length of a screw spike 40. When pressure is admitted to the cylinder 8 above the piston 31 therein, the latter moves downwardly and carries with it the piston rod 32 and nut 41 rigidly secured to its lower end, thereby rotating the screw 35. Assuming the spike to be six inches long and the downward stroke of the piston 32 to be eighteen inches, and that the screw spike is single pitched while the screw 35 is triple pitched, it will be readily seen that the downward movement of the piston for its full stroke will not only rotate the screw 35 but also force it downwardly six inches, which is just what is required in order to fully drive the screw spike into the tie. During this movement the hollow piston rod 32 has naturally telescoped a distance of twelve inches over the screw 35. To restore the parts to normal position, pressure is exhausted from the upper face of piston 31 and is admitted through connection 33 to the lower face thereof. This raises the piston 31 and piston rod 32 and during this upward movement the screw 35 is rotated backwardly and also lifted, being lifted a distance of six inches and screwing downwardly through the nut 41 a distance of twelve inches. The parts are then in position for a repetition of the driving movement above described.

Obviously the machine may be used for driving screw spikes into timbers other than railway cross ties. If spikes are to be driven into short timbers, one driving cylinder only, or a plurality of closely spaced cylinders, may be employed, and single timber positioning means be provided. Any variations, morevover, which may be found practicable, may be made in the pitch of the driving screw and screw spike to be driven, and correspondingly in the pitch of the internally threaded nut with which the driving screw engages and in the length of the piston stroke of the cylinders.

It should be observed that the construction and arrangement of the parts of the spike driving mechanism of the machine permits an adjustment whereby a spike is driven its entire length into a timber by a single reciprocation of the piston of the driving cylinder, thus avoiding the waste of energy which would occur if more than one downward movement of the piston was necessary, and also driving the spikes more positively than could be done by a number of reciprocations.

Since all of the cylinders operate in the same manner and are supplied with similar spike driving means, one only of them has been described. It is to be understood, however, that all the four cylinders are preferably operated simultaneously, which operation can be readily effected by means of a common pressure connection, so that a tie is operated upon to simultaneously drive two spikes into each end thereof. The operation of the machine is extremely rapid and positive, the spikes being driven firmly to the extreme limit of the stroke of the driving mechanism. The machine, moreover, provides means for positioning a tie and holding it securely in position during the driving operation so that there is no danger of the shifting of a tie plate or of the tie during the driving of the screws.

What I claim is:

1. A machine for driving screw spikes comprising a frame, a pair of pressure cylinders thereon, timber engaging means depending from said frame, a pressure cylinder arranged to force a timber thereagainst, and spike driving means arranged to be actuated by said pair of pressure cylinders for driving screw spikes in said timber.

2. A machine for driving screw spikes in cross ties comprising a frame, members arranged on the under side of said frame adjacent the opposite ends thereof, each member having on its lower end means for holding a metal tie plate, means for forcing a cross tie upwardly against the tie plates on the lower ends of the said members, and means adjacent each of said members for simultaneously driving a screw spike through each of the tie plates into the cross tie.

3. A machine for driving screw spikes in cross ties comprising a frame, members arranged on the under side of said frame adjacent the opposite ends thereof, each member having on its lower end means for holding a metal tie plate, means for forcing a cross tie upwardly against the tie plate on the lower ends of the said members, and means adjacent each of said members for simultaneously driving a screw spike through each of the tie plates into the cross tie by imparting longitudinal and rotational movements to the spikes.

4. A machine for driving screw spikes in cross ties, comprising a frame, members arranged on said frame adjacent the opposite ends thereof, each member having means for holding a metal tie plate against its end, means for forcing the cross tie toward the ends of the members and against the tie plates thereon, and means adjacent each of said members for simultaneously driving a screw spike through each of the tie plates into the cross tie by imparting longitudinal and rotational movements to the spikes.

5. A machine for driving screw spikes in railway cross ties comprising a frame, members on said frame and provided each at its lower extremity with a magnet arranged to contact metal tie plates upon a cross tie, a plurality of pressure cylinders arranged to force the tie into contact with said magnet and secure it in position thereagainst, a plurality of pressure cylinders on said frame, and spike driving means arranged to be actuated by said cylinders to operate simultaneously on both ends of said tie.

6. A machine for driving screw spikes in railway cross ties comprising a frame, means for securing a cross tie to said frame, a plurality of pressure cylinders on said frame, a piston and hollow piston rod in each of said cylinders, and spike driving means in conjunction with each of said cylinders comprising a driving screw mounted in said piston rod and counterbalanced therein and means on said piston rod for resolving the reciprocations of said piston into rotational and longitudinal movements of said driving screw.

7. A machine for driving screw spikes in railway cross ties comprising a frame, members arranged on the under side of said frame adjacent the opposite ends thereof, a plurality of pressure cylinders arranged to force a tie upwardly into contact with said members and secured in position thereagainst, a plurality of pressure cylinders on said frame, a piston and hollow piston rod in each of said cylinders, and spike driving means in conjunction with each of said cylinders comprising a driving screw mounted in said piston rod and counterbalanced therein and means on said piston rod for resolving the reciprocations of said piston rod into rotational and longitudinal movements of said driving screw.

In testimony whereof, I have hereunto set my hand.

GRANT B. SHIPLEY.

Witnesses:
 WILLIAM B. WHARTON,
 GLENN H. LERESCHE.